Aug. 11, 1953     R. L. LINDNER ET AL     2,648,716
INDUCTION FURNACE
Filed Nov. 10, 1949
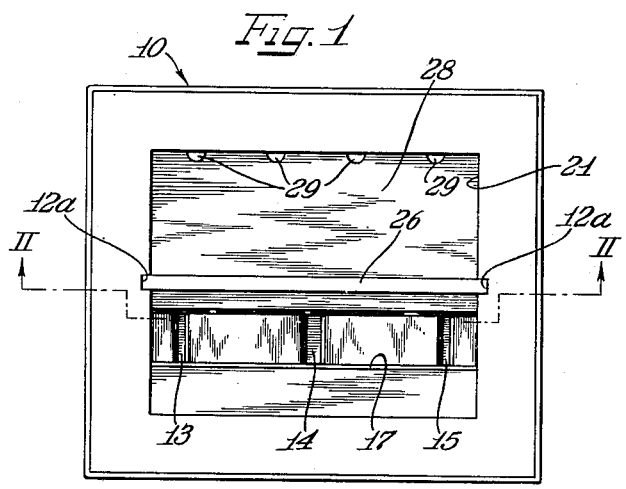
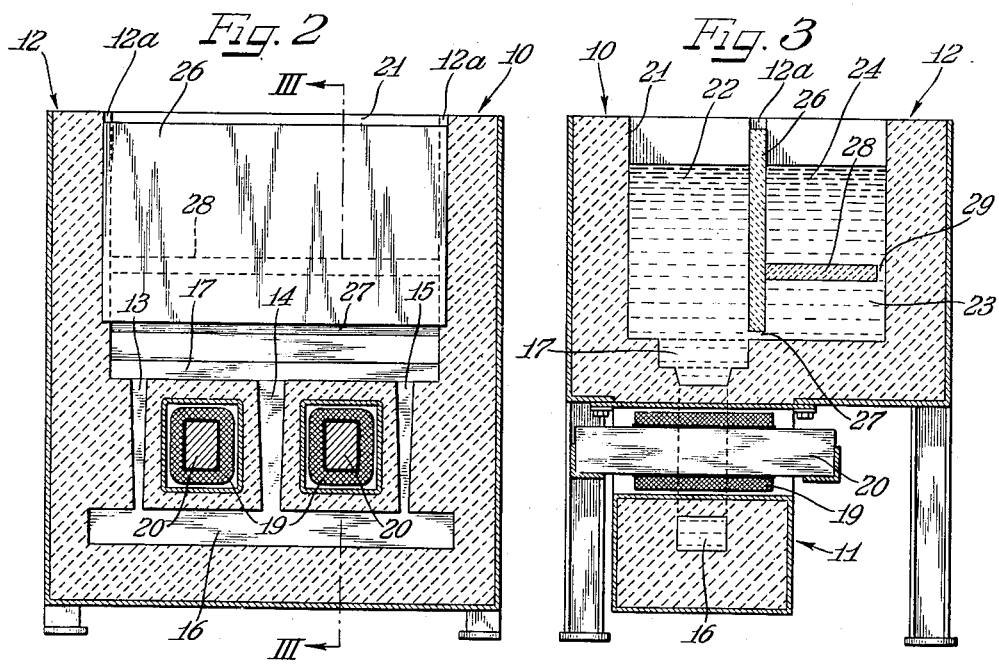
Inventors
Ralph L. Lindner
Tyler K. Hayes
by The Firm of Charlesworth    Attys Patented Aug. 11, 1953

2,648,716

UNITED STATES PATENT OFFICE 2,648,716

INDUCTION FURNACE

Ralph L. Lindner, Cleveland, and Tyler K. Hayes, Cleveland Heights, Ohio, assignors to Thompson Products, Inc., Cleveland, Ohio, a corporation of Ohio Application November 10, 1949, Serial No. 126,672

5 Claims. (Cl. 13—29)

The subject matter of this invention constitutes a continuation-in-part of that disclosed in our copending application Serial No. 51,922, now issued Patent No. 2,503,621.

This invention relates to induction furnaces and more particularly relates to a baffled hearth construction for an improved molten metal holding furnace.

This invention further relates to a method of minimizing slag inclusions in cast metal articles.

The invention will hereinafter be specifically described in connection with the melting or holding of molten light weight metals such as aluminum. Light weight metals such as aluminum are commonly melted in electric induction furnaces and because castings made therefrom are so easily spoiled by slag inclusions or "hard spots," it is particularly desirable that the molten metal be maintained in a stable condition during the course of the casting process. It should be understood, however, that the baffled hearth construction of the present invention will minimize slag inclusions in other varieties of metal as well. Light weight metals such as aluminum are particularly appropriate for the demonstration of the advantageous features of the present invention because aluminum slag and aluminum metal have about the same specific gravity so that the slag does not float off out of the body of molten metal and cannot be removed by conventional means heretofore provided, for example, the well known bottom pour mechanisms.

A conventional induction furnace generates power or heat by flowing an electric current through a molten metal secondary surrounding a channeled interlacing of primary coils. The furnace is usually provided with a deep sump of substantially small cross-section and is equipped to maintain any desired temperature in the sump.

Although temperatures throughout a typical bath of aluminum are usually quite uniform, it is not unusual that slag formations appear in the molten metal due to oxidation of the aluminum. The rate of oxidation and slag formation is materially increased when the metal bubbles freely in the bath and as explained above, the slag will not rise to the surface of the molten metal but remains trapped in the body of the metal.

According to the general features of the present invention, an induction furnace is provided in which the crucible portion of the furnace defines a compartmented hearth. A hearth compartment is located superjacent the secondary sump of the induction furnace, an intermediate basin is located adjacent the hearth compartment and a ladling chamber is located superjacent the intermediate basin and adjacent the hearth compartment. Partitions are provided between the various compartments and are preferably made of a material having relatively high thermal conductivity so as to permit the molten metal throughout the furnace hearth to be readily maintained in a molten condition. The partitions are provided with unimpeded confining flow apertures to establish low-velocity flow communication between the ladling chamber and the intermediate basin and between the intermediate basin and the hearth compartment.

An object of the present invention is to provide an induction furnace with a compartmented hearth, whereby agitation of molten metal in the furnace may be locally confined without sacrificing the heat transfer characteristics of the furnace.

Another object of our invention is to provide an induction furnace of the so-called holding type, whereby relatively slag free molten metal may be drawn for the purpose of pouring castings.

A further object of our invention is to provide an improved method of minimizing objectionable slag inclusions in cast metal articles.

Many other features, advantages, and additional objects of the present invention will become manifest to those versed in the art upon making reference to the detailed description which follows and the annexed sheets of drawings in which:

Figure 1 is a plan view of an induction furnace according to the present invention;

Figure 2 is a cross-sectional view taken on line II—II of Figure 1; and

Figure 3 is a cross-sectional view taken on line III—III of Figure 2.

On the drawing:

Referring to Figures 2 and 3, an induction furnace suitable for holding light weight metal such as aluminum in a molten condition is indicated generally at 10 as comprising a furnace secondary 11 and a crucible 12.

The furnace secondary 11 may be constructed in accordance with any form well known in the art and is herein shown as comprising a well-like structure packed with refractory material to define three vertical channels 13, 14 and 15 connected at the bottom by a straight horizontal chamber 16 of larger cross-section. The channels open upwardly into a furnace secondary outlet channel or sump 17 extending across the furnace 10 near one side thereof.

The two loops formed by the center channel 14 in connection with each of the outside channels 13 and 15 and with the corresponding part of the chamber 16 are interlaced with a pair of primary coils indicated at 19 wound around the closed cores of laminated steel indicated at 20. It will be understood that the coils 19 may be connected to any suitable source of electric current.

The crucible 12, may be formed in a conventional cubical shape and packed with refractory material to define a bath or a hearth 21 located at the top of the sump 17 and the channels 13, 14 and 15.

In accordance with the present invention, the hearth 21 is compartmented to form a hearth compartment 22, an intermediate basin 23 and a ladling chamber 24 (Figure 3).

In effecting the compartmentation, we preferably employ a generally vertically disposed partition 26 which may be located adjacent to and parallel with the outlet channel or sump 17 so that the hearth compartment 22 will be immediately superjacent the furnace secondary 11. The partition 26 is preferably made of a material having a relatively high thermal heat conductivity, for example, a material similar to silicon carbide or the like. The partition 26 may conveniently fit into vertical grooves 12a formed in the refractory lining of the hearth 21 so as to be retained in an upright position.

To establish a restricted low-velocity flow communication between the hearth compartment 22 and the intermediate basin 23, one or more openings 27 may be provided in the partition 26. The opening 27 should be of relatively small cross-sectional area compared to the total wall area presented by the partition 26 and the exact size of the opening to produce optimum results for any specific size of furnace according to the practice of the present invention may be determined experimentally.

The present invention further contemplates the provision of a generally horizontal partition or baffle 28 which is located in the hearth 21 above the opening 27 and extends across the furnace so as to divide the compartment on one side of the partition 26 into the intermediate basin 23 and the ladling chamber 24. The partition or baffle 28 may be made integral with the partition 26 and mounted within the refractory lining of the hearth 21 by any conventional securing means.

To establish a restricted low-velocity flow communication between the intermediate basin 23 and the ladling chamber 24, a plurality of unimpeded confining apertures 29 are defined by the partition or baffle 28. In the present embodiment, the apertures 29 are conveniently formed by scalloping the edge of the partition or baffle 28 abutting the refractory lining of the hearth 21.

It will be understood that the partition or baffle 28 is preferably made of a material similar to that provided in the partition 26 so as not to impair the heat transfer characteristics of the furnace 10.

In practice and in operation, metal is poured from a so-called bull ladle into the hearth compartment 22. The charge of molten metal will be heated in the furnace secondary 11 and the agitated bubbling metal emanating from the outlet channel or sump 17 will generally be confined in the hearth compartment 22.

The opening 27 is preferably located a substantial distance below the top margin of the partition 26, for example, as herein shown, it is at the bottom marginal edge of the partition 26 so that the opening 27 will, at all times, be below the level of the bath of molten metal contained in the hearth compartment 22.

By virtue of such location, it will be apparent that the molten metal will flow under a gravity head through the openings 27 at a low-velocity. As described in our copending application Serial No. 51,922 filed September 30, 1948, now Patent No. 2,503,621, issued April 11, 1950, slag particles formed in the agitated metal contained in the hearth compartment 22 will not flow through the openings 27 due to the presence of gravitational influence of the partition 26. Such slag particles will be attracted toward the partition 26 away from the openings 27 and will ultimately flow to the sides of the hearth compartment 22.

Upon entering the intermediate chamber 22, the molten metal is in a comparatively quiet state so that any foreign particles which may have been carried through the openings 27 will have a chance to settle out. When the intermediate basin 23 is completely filled with metal, any further ingress of molten metal into the intermediate basin 23 through the openings 27 will tend to displace the molten metal through the apertures 29 at low velocity into the ladling chamber 24.

The apertures 29 are of a predetermined cross-sectional area which is relatively small compared to the entire cross-sectional area of the partition or baffle 28. The optimum size of the apertures 29 for any specific size of furnace may be determined experimentally.

It will be apparent, therefore, that the unimpeded confining apertures 29 will further serve to separate the objectionable slag inclusions from the molten metal when it is flowed therethrough. Moreover, the movement of the molten metal from the intermediate basin 23 to the ladling chamber 24 will be so slow that removal or separation of slag inclusions from the molten metal will be greatly enhanced.

By virtue of the arrangement described, the agitated bubbling metal emanating from the furnace secondary is confined in the hearth compartment while a partial settling action occurs in the intermediate basin 23 and all metal for casting is ladled and poured from the quiet pond established in the ladling chamber 24.

It will be understood that a person skilled in in the art might suggest various minor modifications of the structure herein described by way of preferred embodiment and illustrative example, however, we do not propose to be limited to the precise details which have merely been set out for the sake of clarity but wish to embrace within the scope of this patent all such modifications as reasonably and properly come within the scope of our contributions to the art.

We claim as our invention:

1. In an induction furnace, a refractory lined casing, a vertical refractory wall extending through said casing dividing its inner space into a hearth and a lateral chamber, a charging opening in said casing above said hearth, a horizontal refractory wall extending through said lateral chamber and dividing said lateral chamber into an upper lateral chamber and a lower lateral chamber, a ladling opening in said casing above said upper lateral chamber, passages in said walls connecting said hearth and said lower lateral chamber and connecting said lower lateral chamber and said upper lateral chamber, and an inductor unit connected to said casing and providing melting channels communicating with said hearth.

2. In an induction furnace, a refractory lined casing, a vertical wall extending through said casing dividing its inner space into a hearth and a lateral chamber, a charging opening in said casing above said hearth, a horizontal wall extending through said lateral chamber and dividing said lateral chamber into a ladling compartment above the horizontal wall and an intermediate basin below the horizontal wall, passages in said vertical wall connecting said hearth and said intermediate basin, passages in said horizontal wall connecting said ladling compartment and said intermediate basin and an inductor unit connected to said casing and providing melting channels communicating with said hearth, said walls being made of a material having a sufficient high thermal conductivity to permit molten metal in the intermediate basin and the ladling compartment to be heated by the molten metal in the hearth, said passages being sufficiently large to accommodate low velocity flow of substantially slag-free molten metal.

3. In an inductor furnace, a refractory lined casing, means providing a hearth in said casing, means providing a pair of superimposed compartments in said casing adjacent said hearth and including an intermediate basin adjacent a lower portion of said hearth and a ladling chamber superjacent said intermediate basin, an inductor unit connected to said casing and having melting channels communicating with said hearth, a charging opening in said casing above said hearth, a ladling opening in said casing above said ladling chamber, means providing a flow passage between the lower portion of said hearth and said intermediate basin, and means providing a flow passage between the upper portion of said intermediate basin and the lower portion of said ladling chamber, whereby molten metal from said hearth will fill said intermediate basin and will be displaced into said ladling chamber.

4. In an inductor furnace, a refractory lined casing, means providing a hearth in said casing, means providing a pair of superimposed compartments in said casing adjacent said hearth and including an intermediate basin adjacent a lower portion of said hearth and a ladling chamber superjacent said intermediate basin, an inductor unit connected to said casing and having melting channels communicating with said hearth, a charging opening in said casing above said hearth, a ladling opening in said casing above said ladling chamber, means providing a flow passage between the lower portion of said hearth and said intermediate basin, and means providing a flow passage between the upper portion of said intermediate basin and the lower portion of said ladling chamber, whereby molten metal from said hearth will fill said intermediate basin and will be displaced into said ladling chamber, said hearth and said pair of superimposed compartments having a common wall made of material having a sufficiently high thermal conductivity to maintain metal in its molten state in said ladling chamber.

5. In an inductor furnace, a refractory lined casing, means providing a hearth in said casing, means providing a pair of superimposed compartments in said casing adjacent said hearth and including an intermediate basin adjacent a lower portion of said hearth and a ladling chamber superjacent said intermediate basin, an inductor unit connected to said casing and having melting channels communicating with said hearth, a charging opening in said casing above said hearth, a ladling opening in said casing above said ladling chamber, means providing a flow passage between the lower portion of said hearth and said intermediate basin, and means providing a flow passage between the upper portion of said intermediate basin and the lower portion of said ladling chamber, whereby molten metal from said hearth will fill said intermediate basin and will be displaced into said ladling chamber, said flow passages being sufficiently large to accommodate low-velocity flow of substantially slag free molten metal.

RALPH L. LINDNER.
TYLER K. HAYES.

References Cited in the file of this patent

UNITED STATES PATENTS

| Number | Name | Date |
|---|---|---|
| 819,651 | Harris | May 1, 1906 |
| 859,134 | Snyder | July 2, 1907 |
| 1,590,521 | Juretzka | June 29, 1926 |
| 1,737,566 | Brown | Dec. 3, 1929 |
| 2,020,101 | Brown | Nov. 5, 1935 |
| 2,363,759 | Waldie | Nov. 28, 1944 |
| 2,368,173 | Tama et al. | Jan. 30, 1945 |
| 2,464,714 | Petersen | Mar. 15, 1949 |
| 2,499,541 | Tama | Mar. 7, 1950 |
| 2,503,621 | Lindner et al. | Apr. 11, 1950 |
| 2,571,033 | Harter et al. | Oct. 9, 1951 |

FOREIGN PATENTS

| Number | Country | Date |
|---|---|---|
| 880,749 | France | Jan. 11, 1943 |
| 882,085 | France | Feb. 15, 1943 |